(12) United States Patent
Lee

(10) Patent No.: US 11,150,811 B2
(45) Date of Patent: Oct. 19, 2021

(54) DATA STORAGE APPARATUS PERFORMING FLUSH WRITE OPERATION, OPERATING METHOD THEREOF, AND DATA PROCESSING SYSTEM INCLUDING THE SAME

(71) Applicant: SK hynix Inc., Gyeonggi-do (KR)

(72) Inventor: Joo Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 281 days.

(21) Appl. No.: 16/052,234

(22) Filed: Aug. 1, 2018

(65) Prior Publication Data
US 2019/0205038 A1    Jul. 4, 2019

(30) Foreign Application Priority Data

Jan. 3, 2018    (KR) .................... 10-2018-0000732

(51) Int. Cl.
*G06F 3/06*        (2006.01)
*G06F 12/0891*   (2016.01)

(52) U.S. Cl.
CPC ............ *G06F 3/0613* (2013.01); *G06F 3/064* (2013.01); *G06F 3/0652* (2013.01); *G06F 3/0656* (2013.01); *G06F 3/0659* (2013.01); *G06F 3/0679* (2013.01); *G06F 12/0891* (2013.01); *G06F 2212/1016* (2013.01); *G06F 2212/2022* (2013.01); *G06F 2212/7202* (2013.01)

(58) Field of Classification Search
CPC ...... G06F 3/064; G06F 3/0679; G06F 3/0659; G06F 3/0652; G06F 12/0891; G06F 3/0656

USPC .................... 711/103, E12.001, E12.008
See application file for complete search history.

(56) References Cited

U.S. PATENT DOCUMENTS

| | | | |
|---|---|---|---|
| 8,769,190 B1* | 7/2014 | Syu ................... | G06F 3/064 711/103 |
| 2010/0228928 A1* | 9/2010 | Asnaashari ......... | G06F 12/0246 711/154 |
| 2012/0254503 A1* | 10/2012 | Chiu ................... | G06F 3/0619 711/103 |
| 2013/0254508 A1* | 9/2013 | Patil ................... | G06F 3/0674 711/170 |

(Continued)

FOREIGN PATENT DOCUMENTS

| KR | 100951099 | 4/2010 |
|---|---|---|
| KR | 1020160087426 | 7/2016 |

*Primary Examiner* — Sanjiv Shah
*Assistant Examiner* — Edward Waddy, Jr.
(74) *Attorney, Agent, or Firm* — IP & T Group LLP

(57) ABSTRACT

A data storage apparatus includes a nonvolatile memory device including a plurality of dies configured as a plurality of super blocks and a plurality of flush buffer blocks, an open super block manager configured to manage an index of an allocated open super block and a location into which data is to be written in the allocated open super block, an open flush buffer block manager configured to manage indexes of allocated open flush buffer blocks and locations into which data is to be written in the allocated open flush buffer blocks, and a processor configured to identify a first die in which a normal write operation is being performed and a second die next to the first die using the open super block manager, and select open flush buffer block included in dies other than the first die and the second die using the open flush buffer block manager.

13 Claims, 12 Drawing Sheets

(56) References Cited

U.S. PATENT DOCUMENTS

| | | | |
|---|---|---|---|
| 2014/0089565 A1* | 3/2014 | Lee ..................... | G06F 3/0688 |
| | | | 711/103 |
| 2018/0267705 A1* | 9/2018 | Liu ..................... | G06F 3/0679 |
| 2019/0188156 A1* | 6/2019 | Sampathkumar ..... | G06F 12/128 |

* cited by examiner

| SB Index | Page Number | Sector Number |
|---|---|---|
| 1 | 1 | 1 |

FIG.4C

| Die Index | FB Index | Page Number | Sector Number |
|---|---|---|---|
| 1 | 1 | 1 | 1 |
| 2 | 2 | 1 | 1 |
| ⋮ | ⋮ | ⋮ | ⋮ |
| i | 1 | 1 | 1 |

DATA STORAGE APPARATUS PERFORMING FLUSH WRITE OPERATION, OPERATING METHOD THEREOF, AND DATA PROCESSING SYSTEM INCLUDING THE SAME

CROSS-REFERENCES TO RELATED APPLICATION

The present application claims priority under 35 U.S.C. § 119(a) to Korean patent application number 10-2018-0000732, filed on Jan. 3, 2018, which is incorporated herein by reference in its entirety.

BACKGROUND

1. Technical Field

Various embodiments may generally relate to a semiconductor apparatus, and more particularly, to a data storage apparatus, an operating method thereof, and a data processing system including the same.

2. Related Art

In recent years, the paradigm for computer environments changed to ubiquitous computing which may use computer systems every time everywhere. As a result, use of portable electronic apparatuses such as a mobile phone, a digital camera, and a laptop computer has been increasing rapidly. Generally, portable electronic apparatuses use data storage apparatuses that employ memory devices. Data storage apparatuses may be used to store data used in the portable electronic apparatuses.

Data storage apparatuses using memory devices have no mechanical driving units and exhibit good stability and endurance, fast information access rate, and low power consumption. Such data storage apparatuses may include a universal serial bus (USB) memory device, a memory card having various interfaces, a universal flash storage (UFS) device, a solid-state drive (SSD), and the like.

SUMMARY

Embodiments of the present invention are directed to a data storage apparatus with improved write performance, an operating method thereof, and a data processing system including the same.

In an embodiment of the present disclosure, a data storage apparatus may include: a nonvolatile memory device including a plurality of dies each die comprising a plurality of memory blocks with the memory blocks being configured as a plurality of super blocks and a plurality of flush buffer blocks; a random-access memory including an open super block manager configured to manage an index of one open super block allocated among the plurality of super blocks and a location into which data is to be written in the allocated one open super block and an open flush buffer block manager configured to manage indexes of a plurality of open flush buffer blocks allocated to the dies and locations into which data is to be written in the allocated open flush buffer blocks; and a processor configured to identify a first die in which a normal write operation is being performed and a second die next to the first die using the open super block manager when a flush write request is received from a host apparatus, select at least one open flush buffer block included in dies other than the first die and the second die using the open flush buffer block manager, and control the nonvolatile memory device to perform a flush write operation on the selected open flush buffer block.

In an embodiment of the present disclosure, an operating method of a data storage apparatus may include: identifying a first die in which a normal write operation is currently performed and a second die next to the first die when a flush write request is received from a host apparatus; selecting at least one open flush buffer block included in dies other than the first die and the second die; and controlling a nonvolatile memory device to perform a flush write operation on the selected open flush buffer block.

In an embodiment of the present disclosure, a data processing system may include: a host apparatus configured to transfer a flush write request; and a data storage apparatus including a nonvolatile memory device configured to include a plurality of dies configured as a plurality of super blocks and a plurality of flush buffer blocks and a controller configured to control the nonvolatile memory device. The controller may include: a random-access memory including an open super block manager configured to manage an index of one open super block allocated among the plurality of super blocks and a location into which data is to be written in the allocated open super block and an open flush buffer block manager configured to manage indexes of a plurality of open flush buffer blocks allocated to the plurality of dies and locations into which data is to be written in the allocated open flush buffer blocks; and a processor configured to identify a first die in which a normal write operation is being performed and a second die next to the first die using the open super block manager when the flush write request is received from the host apparatus, select at least one open flush buffer block included in dies other than the first die and the second die using the open flush buffer block manager, and control the nonvolatile memory device to perform a flush write operation on the selected open flush buffer block.

In an embodiment of the present disclosure, a memory system may include: a memory device including dies each including element memory blocks of super blocks and including one or more flush buffer blocks; and a controller suitable for managing an information of a second die subsequent to a first die in an order of a super block write operation currently being performed to the first die among the dies, and controlling, in response to a flush operation, the memory device to perform a flush operation to one of the flush buffer blocks included in a die other than the first and second dies among the dies.

In accordance with various embodiments of the invention, as normal write data is stored in units of super blocks and flush write data is stored in units of memory blocks of respective dies, a memory block of a die other than a die to which a normal write data storing operation is interrupted and a die to which the normal write data storing operation is to be resumed may be selected as a flush buffer block.

Accordingly, the flush write data may be securely stored while securing an interleaving scheme for a normal write operation of the normal write data.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 4C is a diagram illustrating an example of an information table for allocated flush buffer blocks, in accordance with an embodiment of the present disclosure;

DETAILED DESCRIPTION

Figure 1:
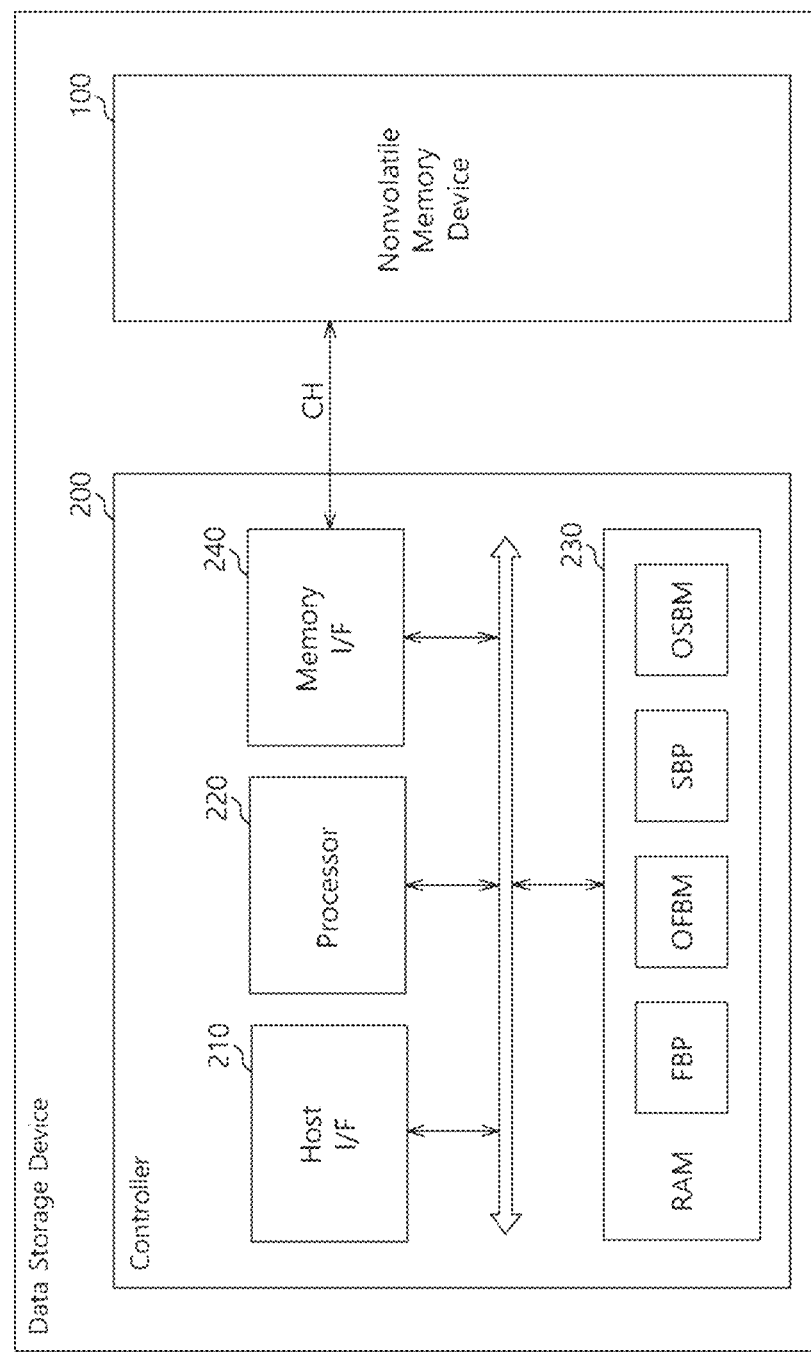
FIG. 1 is a block diagram illustrating a configuration example of a data storage apparatus, in accordance with an embodiment of the present disclosure.

Various embodiments of the present invention will be described in greater detail with reference to the accompanying drawings. It is noted that the drawings are simplified schematic illustrations of various embodiments (and intermediate configurations) of the invention. As such, variations from the configurations and shapes of the illustrations as a result, for example, of manufacturing techniques and/or tolerances, are to be expected. Thus, the described embodiments should not be construed as being limited to the particular configurations and shapes illustrated herein however may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that other embodiments and changes thereof may be made without departing from the principles, spirit or scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives however not both nor any combinations thereof.

As used herein, the term "and/or" includes any and all combinations of one or more of the associated listed items.

As used herein, singular forms are intended to include the plural forms as well, unless the context clearly indicates otherwise.

It will be further understood that the terms "includes," and "including" are used interchangeably in this specification with the open-ended terms "comprises," and "comprising," to specify the presence of any stated elements and to not preclude the presence or addition of one or more other non-stated elements.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, an embodiment of the present disclosure will be described in detail with reference to the accompanying drawings.

FIG. 1 is a block diagram illustrating a data storage apparatus 10 in accordance with an embodiment. The data storage apparatus 10 in accordance with an embodiment may store data to be accessed by a host apparatus (not shown). The host apparatus may be a device such as a mobile phone, an MP3 player, a laptop computer, a desktop computer, a game player, a television (TV), an in-vehicle infotainment system, and the like. The data storage apparatus 10 may also be referred to as a memory system.

The data storage apparatus 10 may be manufactured as any one among various types of storage apparatuses and may be operatively coupled according to a host interface transfer protocol with a host apparatus (not shown). For example, the data storage apparatus 10 may be configured as any one of various types of storage apparatuses, such as a solid-state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The data storage apparatus 10 may be manufactured as any one among various types of packages. For example, the data storage apparatus 10 may be manufactured as any one of various types of packages, such as a package on package (POP), a system in package (SIP), a system on chip (SOC), a multi-chip package (MCP), a chip on board (COB), a wafer-level fabricated package (WFP), and a wafer-level stack package (WSP).

Referring to FIG. 1, the data storage apparatus 10 may include a nonvolatile memory device 100 and a controller 200 operatively coupled via one or more communication channels CH.

The nonvolatile memory device 100 may be operated as a storage medium of the data storage apparatus 10. The nonvolatile memory device 100 may include any one of various types of nonvolatile memory devices, such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase-change random-access memory (PRAM) using a chalcogenide alloy, and a resistive random-access memory (RERAM) using a transition metal compound.

Although the nonvolatile memory device 100 is illustrated as one block in FIG. 1, the nonvolatile memory device 100 may include a plurality of dies, each die including a plurality of memory blocks.

The nonvolatile memory device 100 may include a memory cell array including a plurality of memory cells (not shown) arranged in regions in which a plurality of word lines (not shown) and a plurality of bit lines (not shown) cross each other. The memory cell array may include a plurality of memory blocks and each of the plurality of memory blocks may include a plurality of pages.

For example, each of the memory cells in the memory cell array may be at least one among a single level cell (SLC) in which a single bit data (for example, 1-bit data) is stored, a multilevel cell (MLC) in which 2-bit data is stored, a triple level cell (TLC) in which 3-bit data is stored, and a quad level cell QLC in which 4-bit data is stored. The memory cell array may include at least one or more cells among the SLC, the MLC, the TLC, and the QLC. The memory cell array may include memory cells arranged in a two-dimensional (2D) horizontal structure or memory cells having a 3D vertical structure.

The controller 200 may include a host interface 210, a processor 220, a random-access memory (RAM) 230, and a memory interface 240.

The host interface 210 may perform interfacing between a host apparatus (not shown) and the data storage device 10. For example, the host interface 210 may communicate with the host apparatus through any one among standard transfer protocols such as a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The processor 220 may be configured as a micro control unit (MCU) or a central processing unit (CPU). The processor 220 may process a request (for example, read request and write request) transmitted from the host apparatus. The processor 220 may drive a code-type instruction or algorithm (e.g., software) which is loaded into the RAM 230 for controlling internal function blocks and/or the nonvolatile memory device 100.

The RAM 230 may be configured as a random-access memory, such as a dynamic RAM (DRAM) or a static RAM (SRAM). The RAM 230 may store software driven through the processor 220. The RAM 230 may store data required for the driving of the software. For example, the RAM 230 may be operated as a working memory of the processor 220.

When the nonvolatile memory device 100 is configured as a flash memory device, the processor 220 may control an internal operation of the nonvolatile memory device 100 and drive software known as a flash translation layer (FTL) to provide device compatibility to a host apparatus. Hence, through the driving of the flash translation layer (FTL), the host apparatus may use the data storage apparatus 10 by recognizing the data storage apparatus 10 as a general data storage apparatus such as a hard disc.

The flash translation layer (FTL) may be loaded into the RAM 230 and may include modules configured to perform various functions and metadata required for the driving of the modules. For example, the flash translation layer (FTL) may include a ware-leveling module, a bad block management module, a garbage collection module, an interleaving module, a sudden power-off management module, an address map, and the like, however, the configuration of the flash translation layer (FTL) is not limited thereto.

The RAM 230 may temporarily store data which is to be transmitted to the nonvolatile memory device 100 from a host apparatus or data which is read from the nonvolatile memory device 100 and is to be transmitted to the host apparatus. For example, the RAM 230 may be operated as a buffer memory of the processor 220.

Referring to FIG. 1, the RAM 230 may include a super block pool SBP, an open super block manager OSBM, a flush buffer block pool FBP, and an open flush buffer block manager OFBM.

The super block pool SBP may be configured to include information such as allocation/free and an erase/write (E/W) count for each of super blocks included in the nonvolatile memory device 100. The super block and the super block pool SBP will be described later in detail with reference to the related drawings.

The open super block manager OSBM may be configured to manage information such as an index of an open super block and a location into which data is to be written in the open super block allocated among a plurality of super blocks included in the nonvolatile memory device 100. The location into which data is to be written may represent a page number (for example, page address) and a sector number in the allocated open super block. Whenever an open super block is newly allocated, the open super block manager OSBM may update the index of the open super block due to the newly allocated open super block. Whenever the write operation for the open super block is completed, the open super block manager OSBM may update the location into which data is to be written, for example, the page number and the sector number in the open super block.

The flush buffer block pool FBP may be configured to include information such as allocation/free and an E/W count for each of flush buffer blocks included in the nonvolatile memory device 100. The flush buffer block and the flush buffer block pool FBP will be described later in detail with reference to the related drawings.

The open flush buffer block manager OFBM may be configured to manage information such as indexes of open flush buffer blocks and locations into which data is to be written in the open flush buffer blocks allocated among a plurality of plush buffer blocks included in the nonvolatile memory device 100. A single memory block may be allocated as the flush buffer block for each die (see D1 to Di of FIG. 2). Accordingly, the open flush buffer block manager OFBM may manage information for the same number of open flush buffer blocks as the number (for example, the number of 'i') of dies. The location into which data is to be written may include a page number (for example, page address) and a sector number in the allocated open flush buffer blocks.

Whenever an open flush buffer block for each die D1 to Di is newly allocated, the open flush buffer block manager OFBM may update the index of the open flush buffer block corresponding to each die D1 to Di due to the newly allocated open flush buffer block. Whenever the write operation for each open flush buffer block is completed, the open flush buffer block manager OFBM may update the location into which data is to be written for each open flush buffer block, for example, the page number and the sector number in the open flush buffer block.

Figure 2:
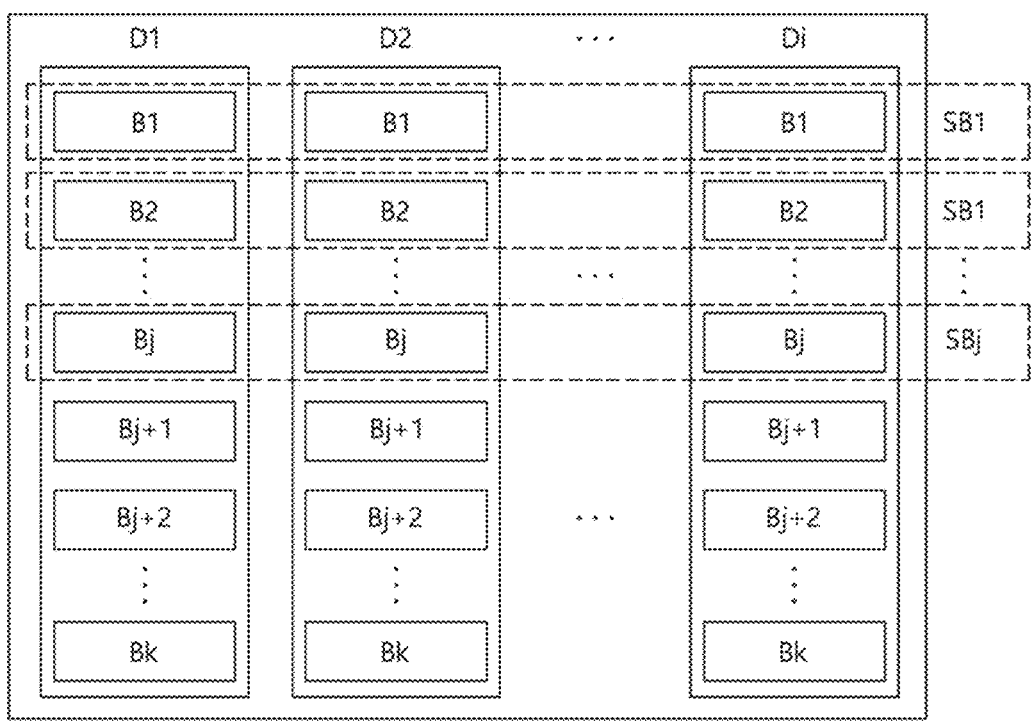
FIG. 2 is a diagram illustrating a configuration example of a nonvolatile memory device of FIG. 1.

FIG. 2 is a diagram illustrating a configuration example of the nonvolatile memory device 100 of FIG. 1.

The nonvolatile memory device 100 may include the plurality of dies D1 to Di. Each of the plurality of dies D1 to Di may include a plurality of memory blocks B1 to Bk. Although not specifically shown in FIG. 2, each of the dies D1 to Di may include a plurality of planes including a plurality of memory blocks. For simplification of the drawings and convenience of the description, in the example of FIG. 2, each of the dies D1 to Di includes one plane.

Referring to FIG. 2, the same memory blocks in the dies D1 to Di may be grouped into one memory block group. The one memory block group that the same memory blocks in the dies D1 to Di are grouped may also be referred to as a super block. The first memory blocks B1 in the dies D1 to Di may be grouped into and used as a first super block SB1. The controller 200 may operate the i first memory blocks B1 included in the first super block SB1 in parallel. For example, the controller 200 may control the nonvolatile memory device 100 to simultaneously perform an operation such as a read or write operation on the i first memory blocks B1 included in the first super block SB1 simultaneously.

The number of super blocks SB included in the nonvolatile memory device 100 may be smaller than the number of memory blocks B1 to Bk included in each of the dies D1 to Di. For example, when each die D1 to D1 includes k memory blocks B1 to Bk as illustrated in FIG. 2, the first memory blocks B1 to j-th memory blocks Bj of the dies D1 to Di may be grouped into and used as the first super block SB1 to a j-th super block SBj. Here, k and j may be an integer of 1 or more and j may be smaller than k. Other memory blocks, for example, j+1-th memory blocks Bj+1 to k-th memory blocks Bk in the dies D1 to Di other than the memory blocks B1 to Bk included in the super blocks SB1 to SBj may not be grouped into super blocks and may be used as unit memory blocks.

A portion of or all the memory blocks among the j+1-th to k-th memory blocks Bj+1 to Bk may be designated as flush buffer blocks FB. The flush buffer blocks FB may be a space configured to temporarily store data stored in a data buffer (not shown) when the flush request is received from a host apparatus or sudden power-off occurs.

Although not shown in FIG. 1, the controller 200 may include a data buffer configured to temporarily store write data received from a host apparatus. Whenever the write request and the write data are received from the host apparatus in a normal state, the processor 220 may not instantly store the write data in the nonvolatile memory device 100 but may temporarily buffer the write data in the data buffer until the buffered write data has a preset size. When a size of the write data stored in the data buffer is larger than a preset size, the processor 220 may control the nonvolatile memory device 100 to store the write data stored in the data buffer in an allocated open super block. Here, the preset size may refer to a minimum size sufficient to perform a write operation. When the size of the write data stored in the data buffer reaches the minimum size sufficient to perform the write operation, the processor 220 may control the nonvolatile memory device 100 to store the corresponding write data in an open super block.

When the flush request is received from a host apparatus or a sudden power-off occurs when the size of the data buffered in the data buffer is equal to or smaller than the preset size, the processor 220 may select one flush buffer block among a plurality of designated flush buffer blocks and control the nonvolatile memory device 100 to store the write data which are stored in the data buffer in the selected flush buffer block.

The data stored in the flush buffer block may be stored in the data buffer again through control of the processor 220 and then stored in an allocated open super block along with the write data transferred from the host apparatus when the size of the data in the data buffer becomes larger than the preset size.

Figure 3A:
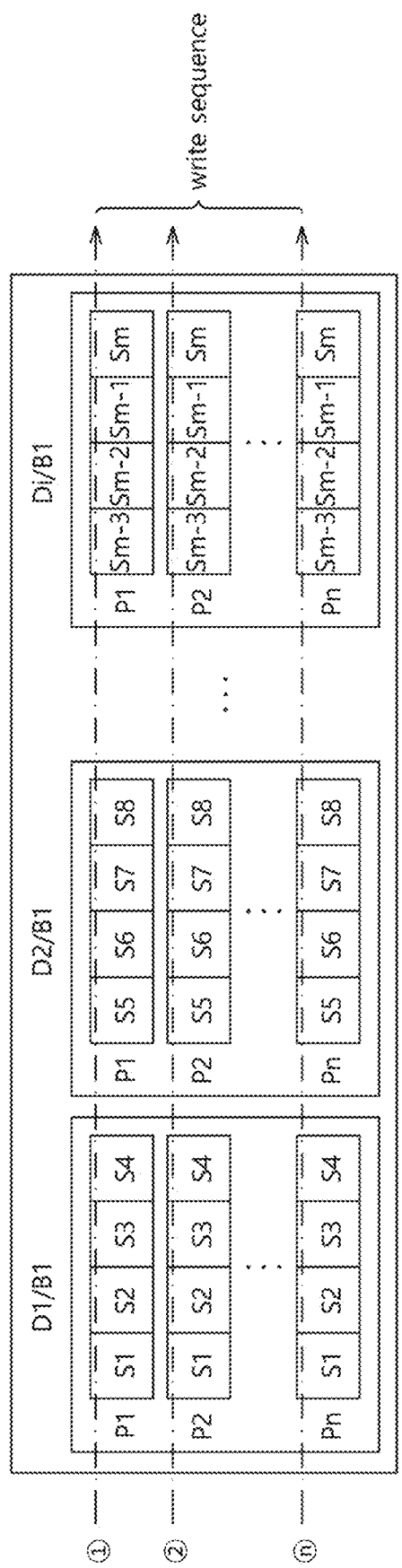
FIG. 3A is a diagram explaining a configuration example of a super block and a write operation sequence, in accordance with an embodiment of the present disclosure.
Figures 3B, 3C:
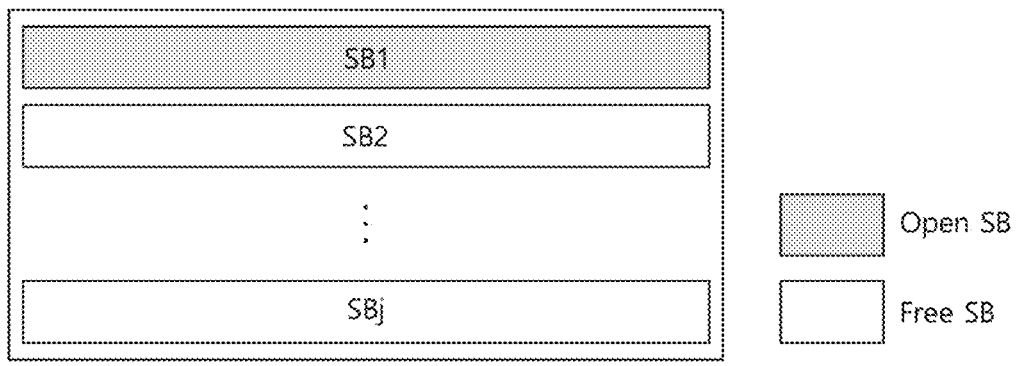
FIG. 3B is a diagram illustrating a configuration example of a super block pool, in accordance with an embodiment of the present disclosure.
FIG. 3C is a diagram illustrating an example of an information table for an allocated super block, in accordance with an embodiment of the present disclosure.

FIG. 3A is a diagram explaining a configuration example of a super block and a write operation sequence in accordance with an embodiment of the present disclosure, FIG. 3B is a diagram illustrating a configuration example of the super block pool SBP in accordance with an embodiment of the present disclosure, and FIG. 3C is a diagram illustrating a configuration example of an information table managed by the open super block manager OSBM in accordance with an embodiment of the present disclosure.

As illustrated in FIG. 3A, one super block SB may include the memory blocks (for example, first memory blocks B1) selected from the dies D1 to Di, respectively. Each of the plurality of first memory blocks B1 may include a plurality of pages P1 to Pn and each of the pages P1 to Pn may include a plurality of sectors S1 to S4, S5 to S8, and Sm-3 to Sm. By way of example and not limitation, it is illustrated in FIG. 3A that four sectors are included in one page, however, the number of sectors included in one page is not limited thereto.

The sectors S1 to Sm may be storage units in the nonvolatile memory device 100 for the write data received from a host apparatus. For example, when one sector is 4 Kbyte and the write data received from the host apparatus is 40 Kbyte, the write data may be written in ten sectors.

The write operation for one super block SB may be performed based on a sequence represented with ① to ⓝ indicated by dotted arrows in FIG. 3A. When the first pages P1 to the n-th pages Pn of the super block SB refer to a first super page to an n-th super page of the super block SB, the write operation for the super block SB may start from the first super page P1 and may be terminated in the n-th super page Pn. In each of the super pages P1 to Pn, the write operation may start from the first sector S1 and may be terminated to the m-th sector Sm. The write operation for a single super block SB may be sequentially performed in order of dies, pages, and sectors in the single super block SB.

The processor 220 may allocate a super block SB, for example, an open super block to store normal write data. The normal write data may refer to write data having a size sufficient to perform a write operation. The processor 220 may allocate a free super block having the smallest E/W count among a plurality of free super blocks as the open super block with reference to the supper block pool SBP illustrated in FIG. 3B. The super block pool SBP may be configured to include information such as allocation/free and the E/W counts for all the super blocks (for example, first to j-th super blocks of FIG. 2) included in the nonvolatile memory device 100. FIG. 3B illustrates an example that the first super block SB1 is allocated as the open super block.

When an open super block is allocated, the processor 220 may manage an index (for example, '1') of the allocated open super block and a page number (for example, '1') and a sector number (for example, '1') into which data is to be written in the allocated open super block using the open super block manager OSBM as illustrated in FIG. 3C. As illustrated in FIG. 3C, the state that both the page number and the sector are '1' may refer to an initial state that the write data is not stored. For example, the page number and the sector number are respectively '2' and '7' in the table managed by the open super block manager OSBM may represent that the location in which the normal write data is to be stored is the seventh sector S7 of the second page P2 in the second die D2 as illustrated in FIG. 3A.

Figure 4A:
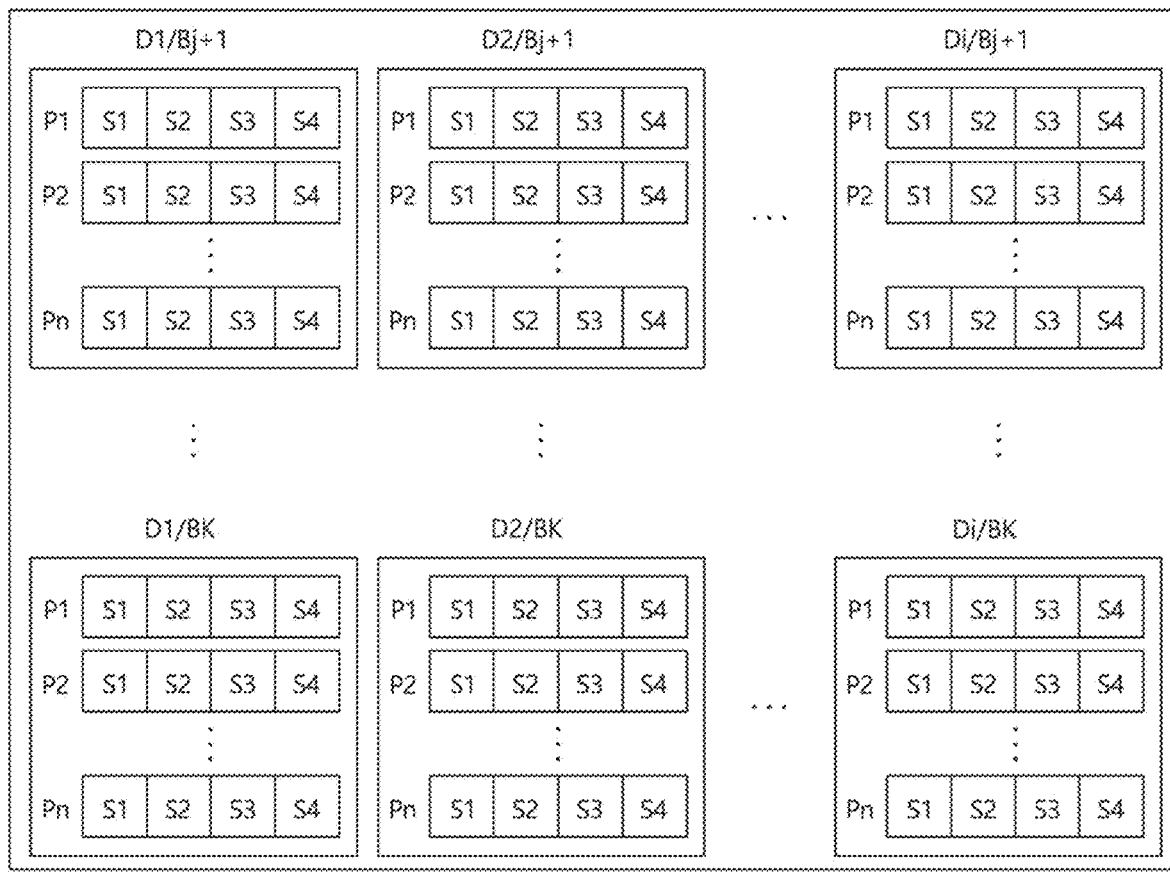
FIG. 4A is a diagram illustrating a configuration example of a flush buffer block group, in accordance with an embodiment of the present disclosure.
Figure 4B:
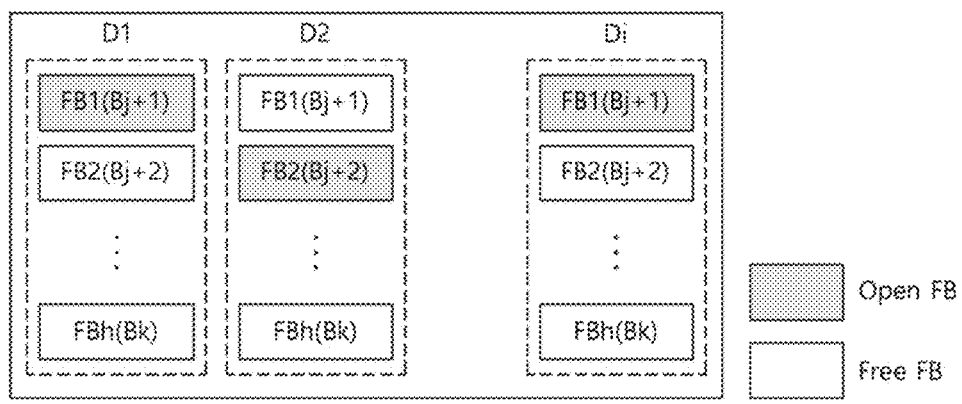
FIG. 4B is a diagram illustrating a configuration example of a flush buffer block pool, in accordance with an embodiment of the present disclosure.

FIG. 4A is a diagram illustrating a configuration example of a flush buffer block group FBG in accordance with an embodiment of the present disclosure, FIG. 4B is a diagram illustrating a configuration example of the flush buffer block pool FBP in accordance with an embodiment of the present disclosure, and FIG. 4C is a diagram illustrating a configuration example of an information table managed by the open flush buffer block manager OFBM in accordance with an embodiment of the present disclosure.

As illustrated in FIG. 4A, the flush buffer block group FBG may include a plurality of memory blocks. It has been illustrated in FIG. 4A that the flush buffer block group FBG includes all memory blocks other than the memory blocks included in the super blocks of FIG. 2, however this is merely exemplary and this is not limited thereto. The j+1-th memory blocks Bj+1 to the k-th memory blocks Bk of the dies D1 to Di included in the flush buffer block group FBG may be separately allocated and managed. Each memory block of the flush buffer block group FBG may include n pages, each page including four sectors like the memory blocks which are included in the super block.

The processor 220 may allocate the flush buffer block FB, for example, open flush buffer blocks to store flush write data. As described above, the flush write data may refer to write data having a preset size or less stored in the flush buffer (not shown) when a flush request is received from a host apparatus or a sudden power-off occurs. The processor 220 may select free flush buffer blocks having the smallest E/W count in the die D1 to Di one by one with reference to the flush buffer block pool FBP illustrated in FIG. 4B. The processor 220 may allocate the selected free flush buffer blocks as a plurality of open flush buffer blocks.

For clarity, the flush buffer blocks included in the dies D1 to Di are indicated as first to h-th flush buffer blocks FB1 to FBh in FIG. 4B. The flush buffer block pool FBP may be configured to include information such as allocation/free and the E/W count for each of the first to the h-th flush buffer blocks FB1 to FBh in the dies D1 to Di. The example that the first flush buffer block FB1 of the first die D1, the second flush buffer block FB2 of the second die D2, the first flush buffer block FB1 of the i-th die Di, and the like are allocated as the open flush buffer blocks is illustrated in FIG. 4B.

When open flush buffer blocks are allocated, the processor 220 may manage the indexes (for example, '1', '2', '1') of the allocated open flush buffer blocks and page numbers (for example, '1', '1') and the sector numbers (for example, '1', '1', '1'), into which data is to be written in the open flush buffer blocks allocated in the dies D1 to Di using the open flush buffer block manager OFBM as illustrated in FIG. 4C. As illustrated in FIG. 4C, the state that all the page numbers and the sector numbers are '1' may refer to an initial state that the flush write data is not stored.

In the open flush buffer block manager OFBM, the indexes 1 to i of the dies D1 to Di may be fixed and whenever the open flush buffer blocks in the dies are newly allocated, the indexes of the corresponding open flush buffer blocks may be updated. Whenever the flush write data are stored in the open flush buffer blocks, the page numbers and sector numbers corresponding to the open flush buffer blocks may be updated.

The point of time at which the flush write data is stored into the allocated open flush buffer blocks may be randomized. For example, when a flush request is received or a sudden power-off occurs during an operation of storing the normal write data in the super block SB, the operation of storing the normal write data is immediately interrupted and the flush write data is stored. When the die to which the normal write data storing operation is interrupted is the same as the die that the flush write data is stored, a program time interval $t_{PROG}$ for the normal write data and a program time interval $t_{PROG}$ for the flush write data in the same die may overlap each other and thus the data may be corrupted. Accordingly, a die other than the die for which the normal write data storing operation is interrupted and the die for which the normal write data storing operation is to be resumed may be selected as a die that the flush write data is to be stored.

In accordance with the embodiment, as the normal write data is stored in units of the super blocks SB and the flush write data is stored in units of memory blocks of the respective dies, a memory block of a die other than the die to which the normal write data storing operation is interrupted and the die to which the normal write data storing operation is to be resumed may be selected as the flush buffer block. Accordingly, the flush write data may be securely stored while securing an interleaving scheme for a normal write operation of the normal write data.

Figure 5:
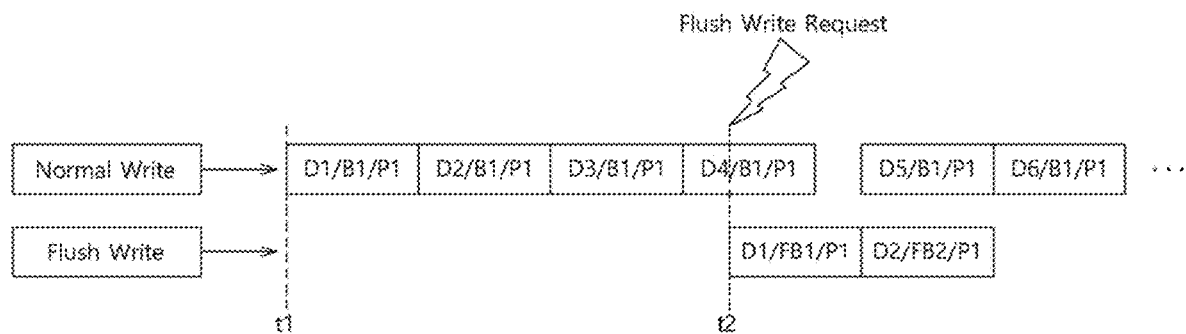
FIG. 5 is a diagram illustrating an example that a flush write request is generated during a normal write operation, in accordance with an embodiment of the present disclosure.

FIG. 5 is a diagram illustrating an example that a flush write operation is performed during a normal write operation in accordance with an embodiment of the present disclosure.

Referring to FIG. 5, when a flush write request is received from a host apparatus at a time t2 after the normal write operation of storing the normal write data starts at a time t1, the processor 220 may identify a die that the normal write operation is currently performed and a die that the normal write operation is to be subsequently performed using the open super block manager OSBM. For example, FIG. 5 illustrates that the die currently performing the normal write operation is the fourth die D4 and that the normal write operation is to be subsequently performed in the fifth die D5.

The processor 220 may select open flush buffer blocks included in dies other than the die (e.g., a fourth die D4) to which the normal write operation is currently performed and the die (e.g., a fifth die D5) to which the normal write operation is to be subsequently performed using the open flush buffer block manager OFBM. In the described example, the open flush buffer blocks FB1 and FB2 of the first die D1 and the second die D2 are selected as illustrated in FIG. 5.

The processor 220 may control the nonvolatile memory device 100 to perform the flush write operation on the selected open flush buffer blocks FB1 and FB2 of the first die D1 and the second die D2. The processor 220 may control the nonvolatile memory device 100 to resume the normal write operation to the die (i.e., the fifth die D5) to which the normal write operation is supposed to be subsequently performed before the flush write operation is completed.

The memory interface 240 may control the nonvolatile memory device 100 according to control of the processor 220. The memory interface 240 may also be referred to as a memory controller. The memory interface 240 may provide control signals to the nonvolatile memory device 100. The control signals may include a command, an address, and the like for controlling the nonvolatile memory device 100. The memory interface 240 may provide data to the nonvolatile memory device 100 or receive data from the nonvolatile memory device 100. The memory interface 240 may be coupled to the nonvolatile memory device 100 through a channel CH. The channel may include one or more signal lines.

Figure 6:
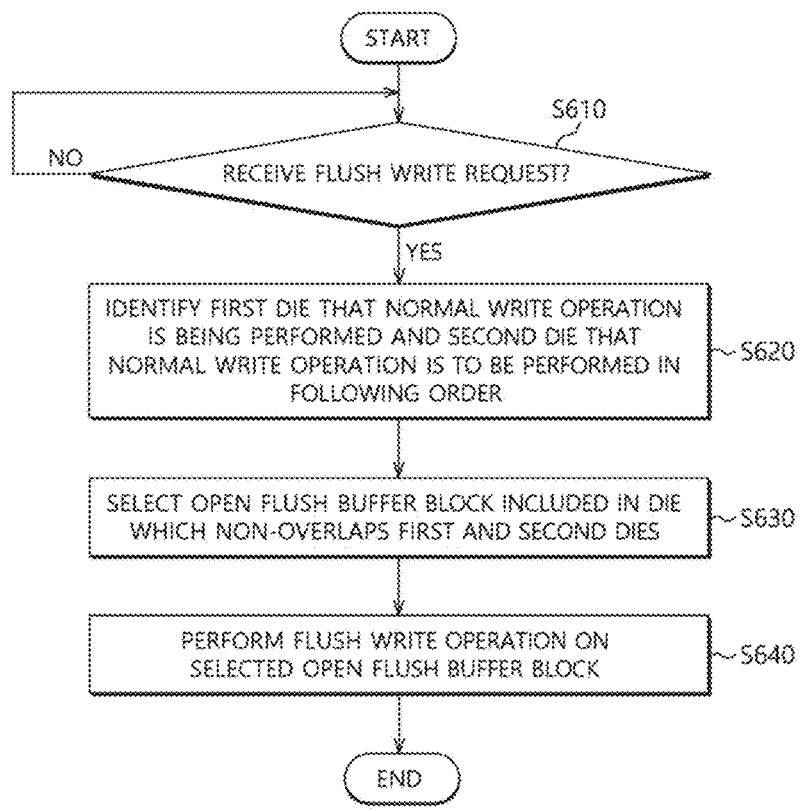
FIG. 6 is a flowchart illustrating an operating method of a data storage apparatus, in accordance with an embodiment of the present disclosure.

FIG. 6 is a flowchart of an operating method of a data storage apparatus in accordance with an embodiment of the present disclosure. The operating method of a data storage apparatus in accordance with an embodiment will be described with reference to FIG. 6 with FIGS. 1 to 5.

In operation S610, a processor (see 220 of FIG. 1) of the controller (see 200 of FIG. 1) may determine whether a flush write request is received from a host apparatus. When the flush write request is received, the processor may proceed to operation S620.

In operation S620, the processor 220 may identify a die (for example, fourth die D4 of FIG. 5) that a normal write operation is currently performed and a die (for example, fifth die D5 of FIG. 5) that the normal write operation is to be subsequently performed using the open super block manager OSBM.

In operation S630, the processor 220 may select open flush buffer blocks (see FB1 and FB2 of FIG. 5) included in dies (for example, first and second dies D1 and D2 of FIG. 5) other than the fourth die D4, to which the normal write data storing operation is interrupted, and the fifth die D5, to which the normal write data storing operation is to be resumed, using the open flush buffer block manager OFBM.

In operation S640, the processor 220 may control the nonvolatile memory device 100 to perform the flush write operation on the selected open flush buffer blocks FB1 and FB2.

Figure 7:
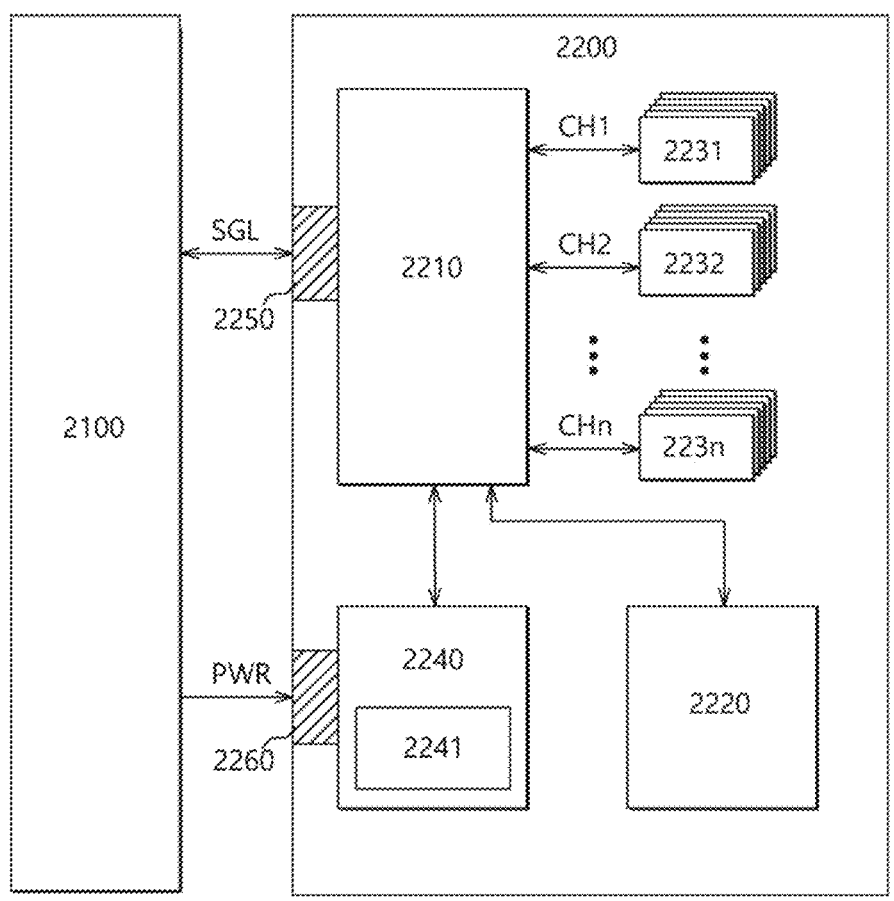
FIG. 7 is a diagram illustrating an example of a data processing system including a solid-state drive, in accordance with an embodiment of the present disclosure.

FIG. 7 is a diagram illustrating an example of a data processing system including a solid-state drive (SSD) in accordance with an embodiment. Referring to FIG. 7, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n in accordance with control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 8:
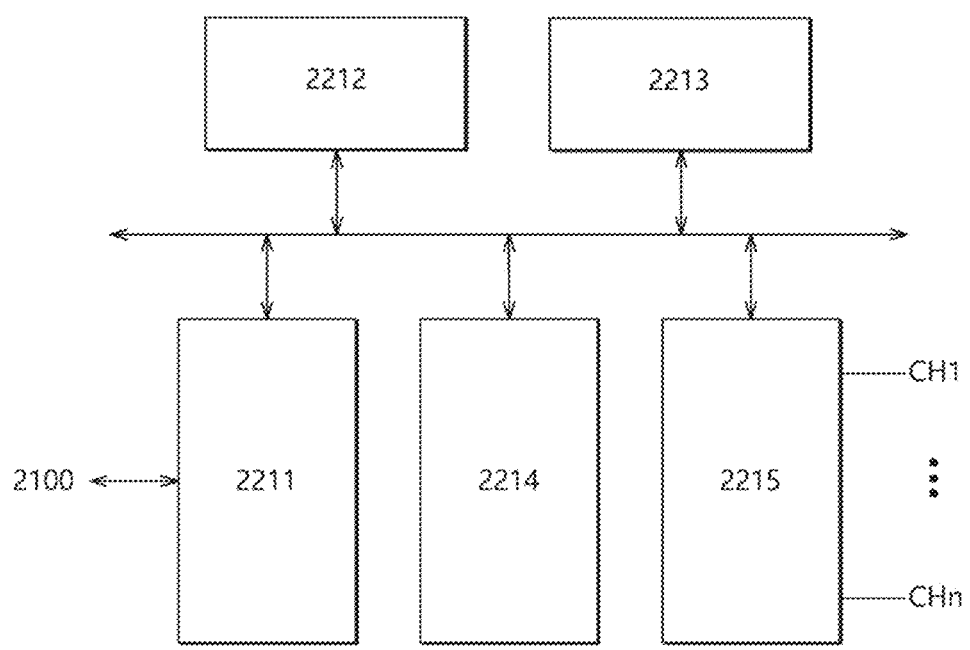
FIG. 8 is a diagram illustrating an example of a controller illustrated in FIG. 7, in accordance with an embodiment of the present invention disclosure.

FIG. 8 is a diagram illustrating an example of the controller 2210 of FIG. 7. Referring to FIG. 8, the controller 2210 may include a host interface unit 2211, a control unit 2212, a random-access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD

2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

The random-access memory 2213 may be configured as the RAM 230 of FIG. 1.

Figure 9:
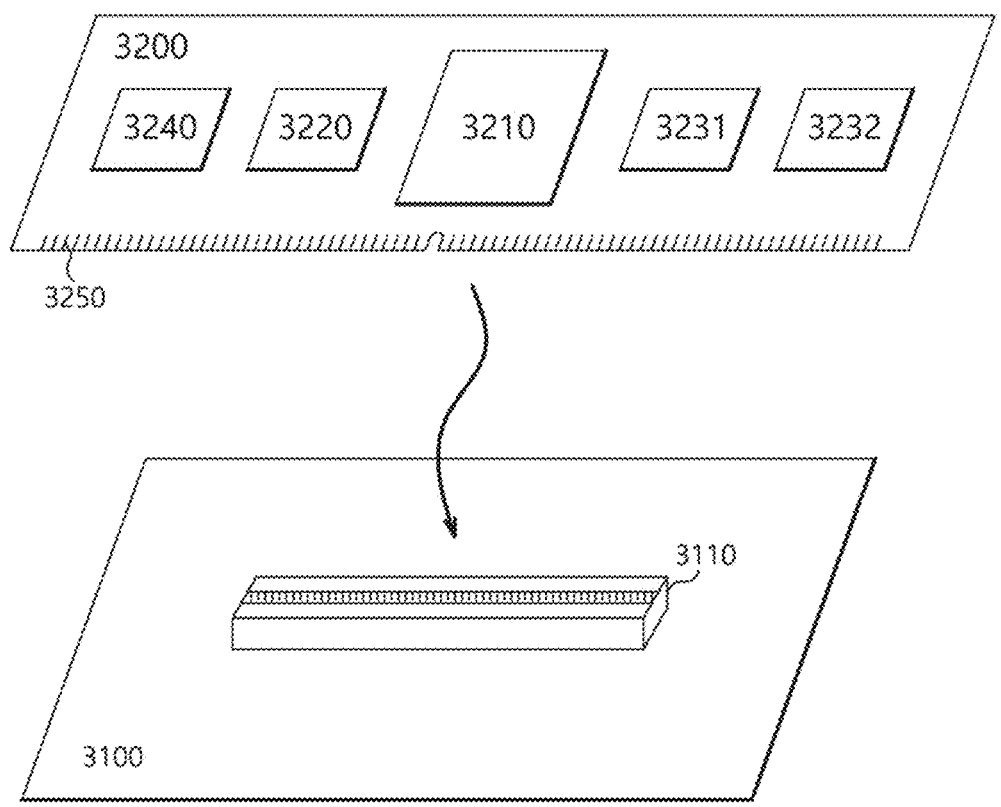
FIG. 9 is a diagram illustrating an example of a data processing system including a data storage apparatus, in accordance with an embodiment of the present disclosure.

FIG. 9 is a diagram illustrating an example of a data processing system including a data storage apparatus in accordance with an embodiment. Referring to FIG. 9, a data processing system 3000 may include a host apparatus 3100 and a data storage apparatus 3200.

The host apparatus 3100 may be configured in a board form such as a printed circuit board (PCB). Although not shown in FIG. 9, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 210 may control an overall operation of the data storage apparatus 3200. The controller 3210 may be configured to have the same configuration as the controller 2210 illustrated in FIG. 8.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 10:
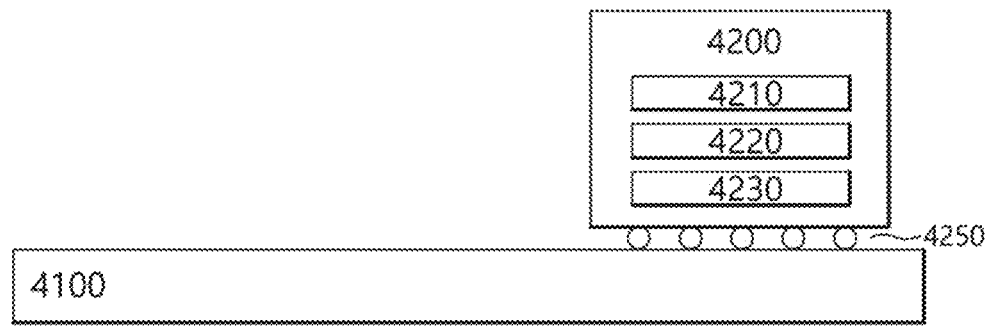
FIG. 10 is a diagram illustrating an example of a data processing system including a data storage apparatus, in accordance with an embodiment of the present disclosure.

FIG. 10 is a diagram illustrating an example of a data processing system including a data storage apparatus in accordance with an embodiment. Referring to FIG. 10, a data processing system 4000 may include a host apparatus 4100 and a data storage apparatus 4200.

The host apparatus 4100 may be configured in a board form such as a PCB. Although not shown in FIG. 10, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through solder balls 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 11:
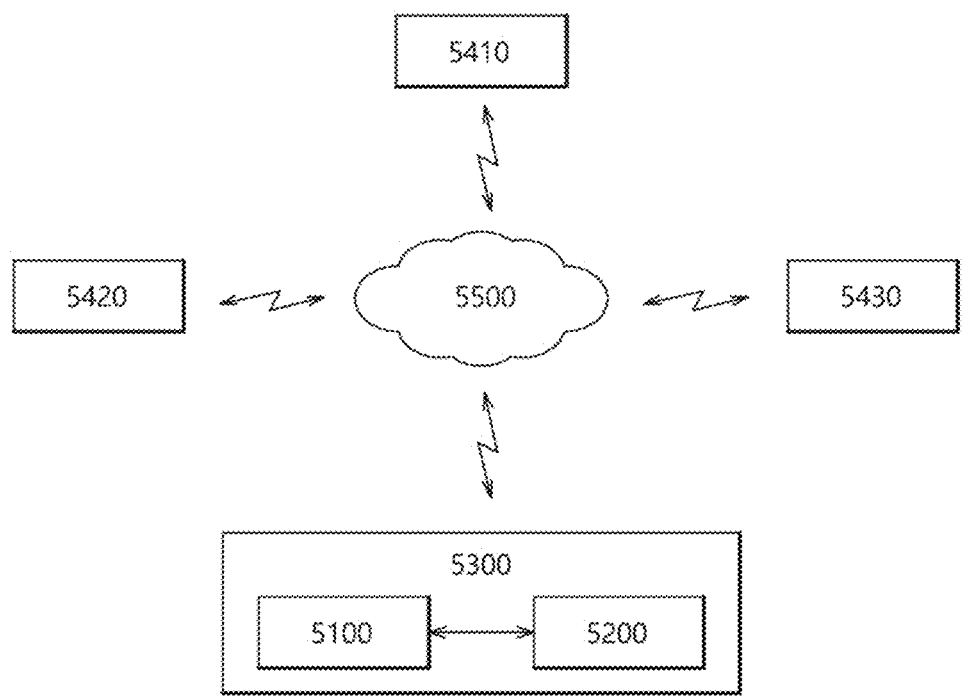
FIG. 11 is a diagram illustrating an example of a network system including a data storage apparatus, in accordance with an embodiment of the present disclosure.

FIG. 11 is a diagram illustrating an example of a network system 5000 including a data storage apparatus in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10 of FIG. 1, the data storage apparatus 2200 of FIG. 7, the data storage apparatus 3200 of FIG. 9, or the data storage apparatus 4200 of FIG. 10.

Figure 12:
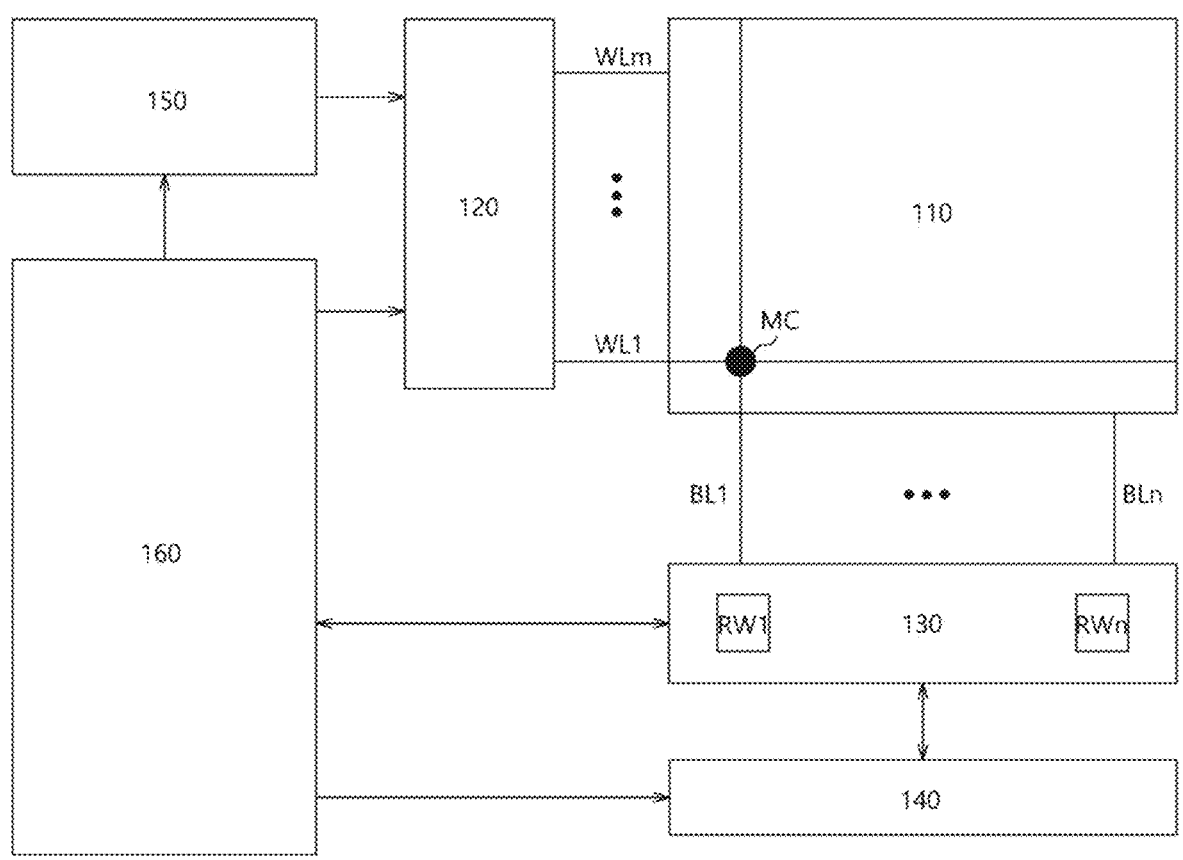
FIG. 12 is a block diagram illustrating an example of a nonvolatile memory device included in a data storage apparatus, in accordance with an embodiment of the present disclosure.

FIG. 12 is a block diagram illustrating an example of a nonvolatile memory device included in a data storage apparatus in accordance with an embodiment. Referring to FIG. 12, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data storage apparatus comprising:
a nonvolatile memory device including a plurality of dies each die comprising a plurality of memory blocks with the memory blocks being configured as a plurality of super blocks and a plurality of flush buffer blocks;
a random-access memory including an open super block manager configured to manage an index of one open super block allocated among the plurality of super blocks and a location into which data is to be written in the allocated open super block and an open flush buffer block manager configured to manage indexes of a plurality of open flush buffer blocks allocated to the dies and locations into which data is to be written in the allocated open flush buffer blocks; and
a processor configured to identify a first die in which a normal write operation is being performed and a second die next to the first die using the open super block manager when a flush write request is received from a host apparatus, select at least one open flush buffer block included in dies other than the first die and the second die using the open flush buffer block manager, and control the nonvolatile memory device to perform a flush write operation on the selected open flush buffer block,
wherein each of the first and second dies includes a memory block constituting the allocated open super block,
wherein the random-access memory includes a super block pool configured to store information for allocation/free and an erase/write (E/W) count of each of the plurality of super blocks and a flush buffer block pool configured to store information for allocation/free and an E/W count of each of the plurality of flush buffer blocks, and
wherein the processor allocates a super block having the smallest E/W count among the plurality of super blocks as the open super block using the super block pool, and allocates flush buffer blocks having the smallest E/W count among the plurality of flush buffer blocks included in the dies as open flush buffer blocks using the flush buffer block pool.

2. The data storage apparatus of claim 1, wherein the open super block manager updates the index of the open super block whenever the open super block is newly allocated and updates the location into which data is to be written in the open super block whenever the normal write operation is performed.

3. The data storage apparatus of claim 1, wherein whenever an open flush buffer block for each die is newly allocated, the open flush buffer block manager updates an index of the open flush buffer block corresponding to each die and whenever the flush write operation is performed, the open flush buffer block manager updates a location into which data is to be written in a corresponding open flush buffer block.

4. The data storage apparatus of claim 1, wherein the processor controls the nonvolatile memory device to subsequently perform the normal write operation on the second die before the flush write operation is completed.

5. The data storage apparatus of claim 1, wherein the plurality of super blocks are blocks that the same memory blocks included in the plurality of dies are grouped.

6. The data storage apparatus of claim 5, wherein each of the memory blocks included in each super block includes a plurality of pages having a plurality of sectors.

7. The data storage apparatus of claim 6, wherein the location into which data is to be written included in the open super block manager includes a page number and a sector number.

8. The data storage apparatus of claim 6, wherein the normal write operation is sequentially performed in orders of dies, pages, and sectors included in the open super block.

9. An operating method of a data storage apparatus including a nonvolatile memory device configured to include a plurality of dies configured as a plurality of super blocks and a plurality of flush buffer blocks and a controller configured to control an operation of the nonvolatile memory device, the method comprising:

identifying a first die in which a normal write operation is currently performed and a second die next to the first die among the plurality of dies when a flush write request is received from a host apparatus;

selecting at least one open flush buffer block included in dies other than the first die and the second die;

controlling the nonvolatile memory device to perform a flush write operation on the selected open flush buffer block; and storing information for allocation/free and an erase/write (E/W) count of each of the plurality of super blocks, and storing information for allocation/free and an E/W count of each of the plurality of flush buffer blocks, wherein each of the first and second dies includes a memory block constituting an open super block allocated to perform the normal write operation, and wherein a super block having the smallest E/W count among the plurality of super blocks is allocated as the open super block, and flush buffer blocks having the smallest E/W count among the plurality of flush buffer blocks included in the dies other than the first die and the second die is allocated as the open flush buffer block.

10. The method of claim 9, wherein the plurality of super blocks are blocks that the same memory blocks included in the plurality of dies are grouped, and the normal write operation is performed in the open super block allocated among the plurality of super blocks.

11. The method of claim 10, wherein the identifying of the first die and the second die is performed by determining a current write location and a location into which data is to be written next to the current write location using an open super block manager which manages an index and a location to the written for the open super block.

12. The method of claim 9, wherein the plurality of flush buffer blocks include a plurality of memory blocks included in the plurality of dies, and the open flush buffer block is selected from among open flush buffer blocks corresponding to dies other than the first die and the second die using an open flush buffer block manager which manages indexes and locations into which data is to be written for the open flush buffer blocks allocated to the dies one by one among the plurality of flush buffer blocks.

13. A memory system comprising:

a memory device including dies each including element memory blocks of super blocks and including one or more flush buffer blocks; and a controller suitable for:

managing an information of a second die subsequent to a first die in an order of a super block write operation currently being performed to the first die among the dies, and;

controlling, in response to a flush write request, the memory device to perform a flush write operation to one of the flush buffer blocks included in a die other than the first and second dies among the dies, wherein each of the first and second dies includes an element memory block constituting a super block allocated to perform the super block write operation, wherein the controller includes a super block pool configured to store information for allocation/free and an erase/write (E/W) count of each of the super blocks and a flush buffer block pool configured to store information for allocation/free and an E/W count of each of the flush buffer blocks, and wherein the controller allocates a super block having the smallest E/W count among the super blocks as an open super block using the super block pool, and allocates flush buffer blocks having the smallest E/W count among the flush buffer blocks included in the die as open flush buffer blocks using the flush buffer block pool.

* * * * *